UNITED STATES PATENT OFFICE.

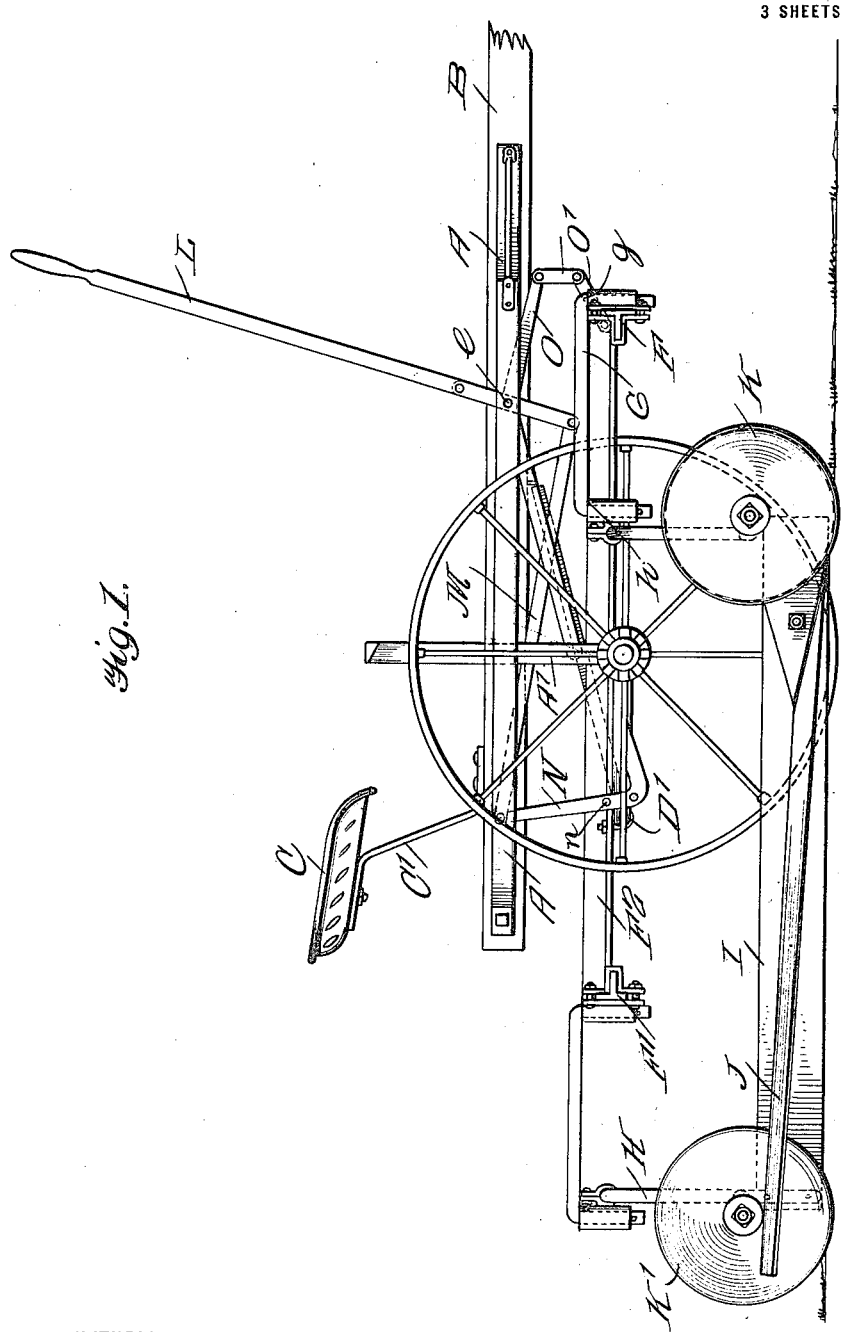

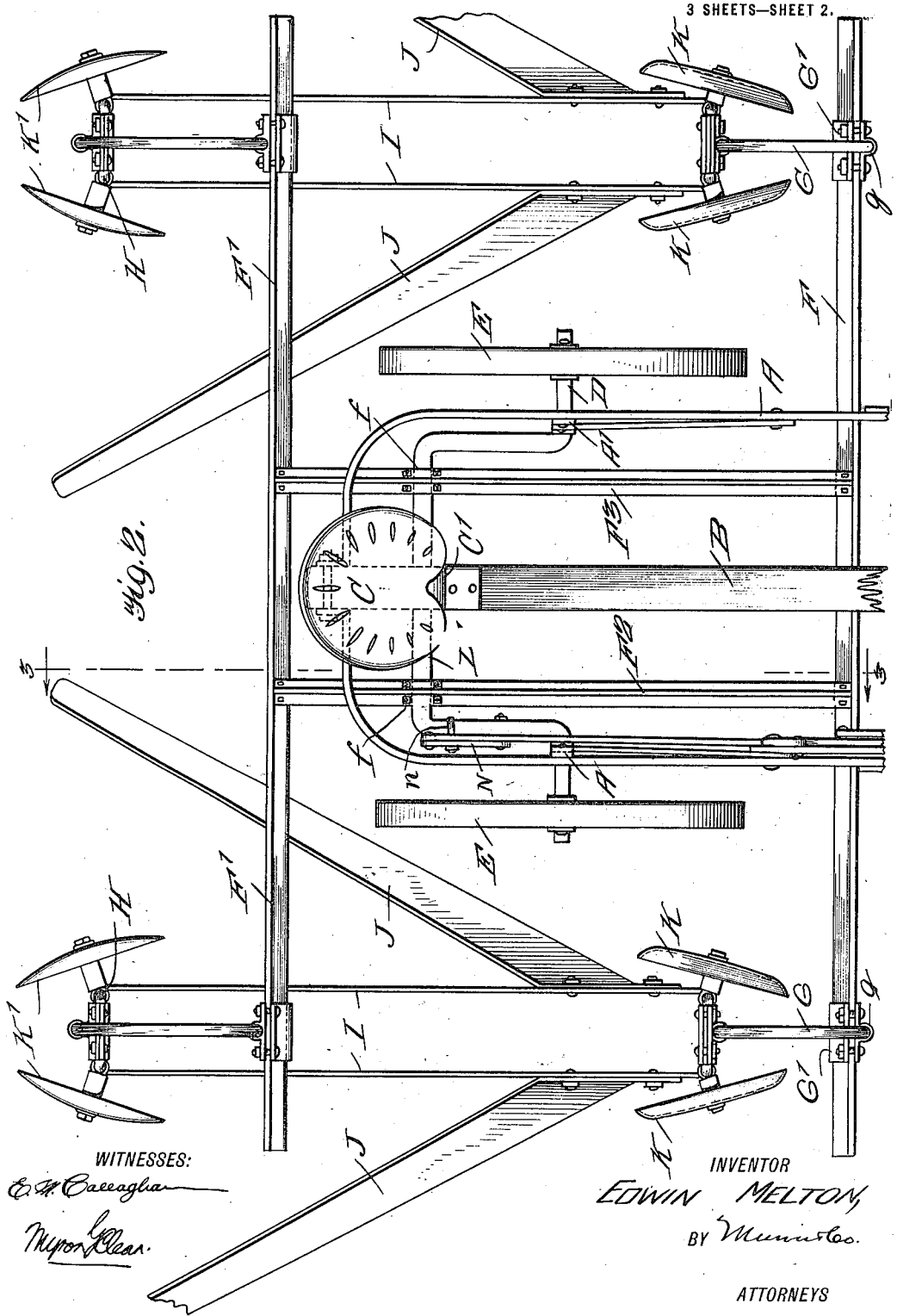

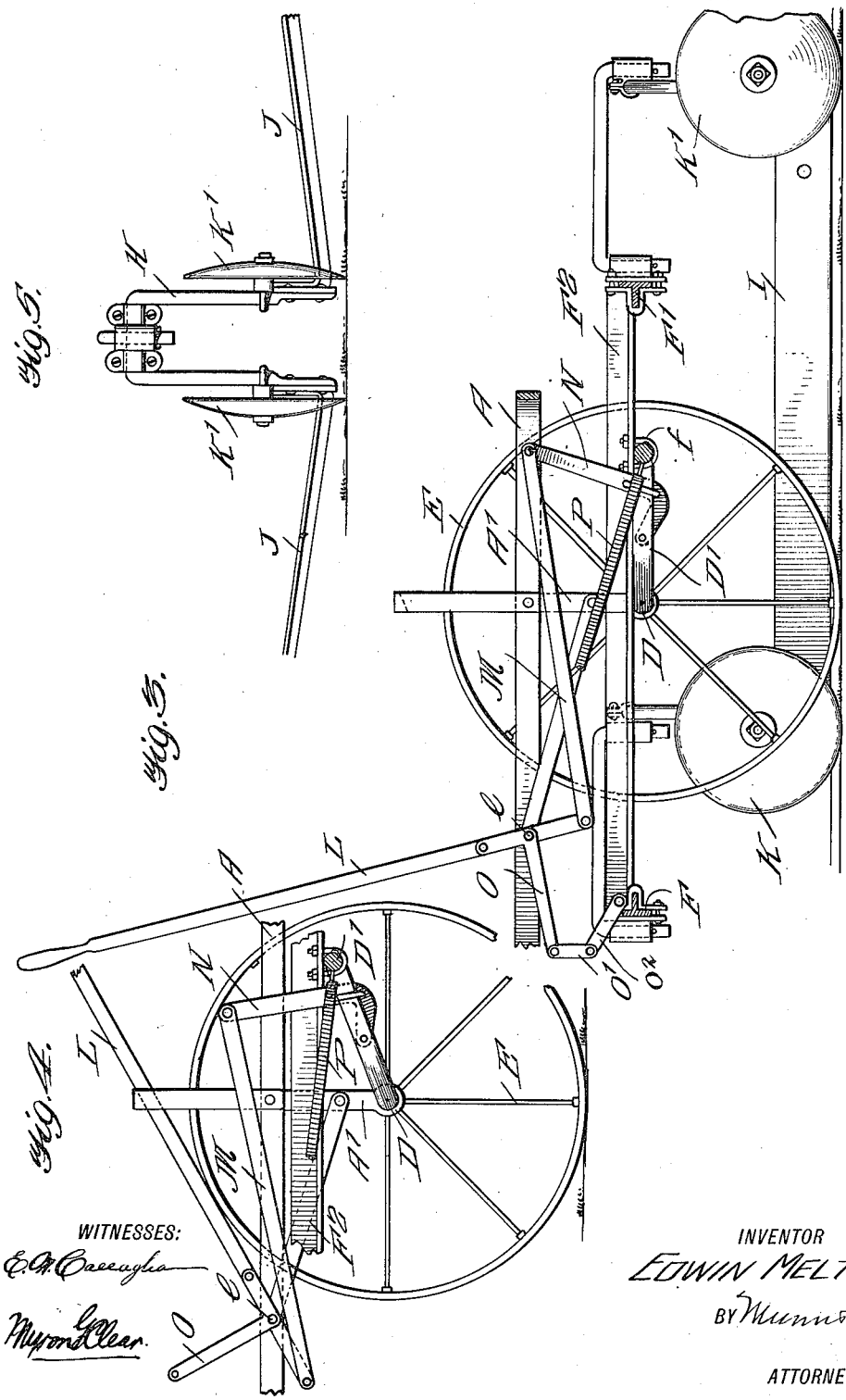

EDWIN MELTON, OF CLOVIS, NEW MEXICO.

CULTIVATOR.

1,155,833. Specification of Letters Patent. Patented Oct. 5, 1915.

Application filed February 19, 1915. Serial No. 9,296.

*To all whom it may concern:*

Be it known that I, EDWIN MELTON, a citizen of the United States, and a resident of Clovis, in the county of Curry and State of New Mexico, have invented certain new and useful Improvements in Cultivators, of which the following is a specification.

My present invention relates generally to cultivators, and more particularly to a wheeled implement of this type, my object being to provide a double row sled cultivator for listed ground, having the novel features to be hereinafter particularly described and claimed, whereby the sleds are rendered self adjustable in the rows, may be raised and lowered to and from the ground, and have means for effectively guiding them in operation.

In the accompanying drawings illustrating my invention, and forming a part of this application—Figure 1 is a side elevation; Fig. 2 is a top plan view, certain of the parts being broken away; Fig. 3 is a vertical longitudinal section taken substantially on line 3—3 of Fig. 2; Fig. 4 is a fragmentary view, illustrating certain of the parts shown in Fig. 3, and in position with the cultivator frame raised, and Fig. 5 is a front view of one of the sleds.

Referring now to these figures, the main frame of my improved cultivator, includes horizontally extending side bars A, the forward and rear ends of which are securely fastened to the tongue B at spaced points, and from which tongue rises the rearwardly inclined seat spring C', carrying the seat C at its upper end. This main frame also includes intermediate vertically disposed side bars A', the lower ends of which are journaled upon a transversely extending axle D, upon the outer extremities of which are revolubly mounted the wheels E, this axle D being provided with an intermediate crank portion D' between the frame bars A'.

Below the main frame is arranged a horizontal cultivator frame consisting of forward and rear transverse bars F and F', which are connected below the main frame by longitudinal parallel bars F² and F³, these latter bars being journaled at points intermediate their ends, and nearer to their rear ends, at *f*, upon the intermediate crank portion D' of the axle D.

Adjacent their outer ends the transverse bars F and F' of the cultivator frame, are provided with adjustable longitudinally alined bolted clips G', upon which are carried vertical bearings *g* for the forward downturned ends of arms G, the rear ends of which are similarly disposed and projected into bearings *h* at the upper end of U-shaped hanger bars H.

At each side of the cultivator frame, the depending extensions of the U-shaped hanger bars H are connected by longitudinally extending parallel runners I intermediately to which are secured the inner forward ends of the rearwardly and outwardly flaring cutters J, revolving cultivator disks K and K' being respectively mounted in pairs at the forward and rear ends of the runners I.

The forward disks K effectively guide the sled thus formed, in the rows, these sleds being permitted self adjustment through their suspension from the swiveled rods G, and the rear disks K', at the rear end of the sled, operate to effectively throw dirt onto the rows. The operation of the knives J, which are now in common use, is so well known that it needs no description at this point.

The sleds thus formed at opposite sides of the cultivator frame, may be raised and lowered with this cultivator frame, due to the presence of a lever L, which is intermediately pivoted at *l* to one side of the main frame, and is pivotally connected at its lower end to a rearwardly projecting connecting rod M, the rear end of which in turn is pivotally connected to the upper end of a bracket arm N securely bolted or otherwise fastened at *n* to one side of the crank portion D' of the axle D, so that when the upper portion of the lever L is rocked or moved in a rearward direction, the connecting rod M being thus drawn forward in a longitudinal direction, the crank portion D' of the axle D is raised, elevating the cultivator frame wth its side sleds, along with the frame. To the lever L, at a point adjacent its pivot *l*, is also rigidly secured an arm O which is connected by links O' and O² to the forward transverse cultivator frame bar F, as seen in Fig. 3, so that when the lever L is moved rearwardly to raise the crank portion D' of the axle D, which acts upon the rear portion of the cultivator frame, the front portion of the cultivator frame will be similarly raised, and the frame thus held substantially level at all times.

A coil spring P', connected at its rear end to the crank D', and at its forward end to the under side of the tongue B, assists to a certain extent, the upward movement of the cultivator frame when the sleds are to be raised from the ground at the end of furrows, in order that the manual operation by means of lever L may be lightened to a similar extent.

A cultivator of the sled type, as thus shown and described, is, in use, particularly desirable in connection with listed ground, and in addition to the fact that it takes in two rows at a time, its various adjustable parts are particularly advantageous in permitting the sleds to adjust themselves in the rows, in effectively guiding the sleds in the rows, and in permitting them to be raised and lowered to and from the ground at the beginning and end of the furrows.

I claim—

1. In a cultivator of the character described, a main frame, a horizontal cultivator frame within the main frame and including transversely extending bars at its forward and rear ends, sleds carried by the cultivator frame at each side thereof, each of said sleds having swiveled connections with the said forward and rear cultivator frame bars whereby to permit of free lateral adjustment thereof, and each of said sleds including parallel longitudinal runners and cultivating implements carried by the said sleds, certain of which implements are set to guide the sleds in operation.

2. In a cultivator of the character described, a main wheeled frame, a horizontal cultivator frame within the main frame, sleds carried by the cultivator frame at each side thereof, each of which sleds has swiveled connections with the cultivator frame whereby to permit of free lateral movement thereof, and each of which sleds includes parallel runners, and cultivating implements carried by the said sleds.

3. In a cultivator of the character described, a main wheeled frame, a horizontal cultivator frame within the main frame, sleds carried by the cultivator frame at the sides thereof, each of said sleds having swiveled connection with the cultivator frame permitting of free lateral movement thereof, and cultivating implements carried by the sleds, certain of which operate to guide the sleds and control their lateral movement.

4. In a cultivator of the character described, the combination of a main wheeled frame, a horizontally disposed cultivator frame in the main frame, and including transversely extending forward and rear bars, clips adjustably bolted upon the outer portion of the said transverse bars and being provided with a vertical bearing, sleds carried by the opposite sides of the cultivator frame and each having vertical bearings at its forward and rear ends, carrying rods having downturned forward and rear ends, the former of which are disposed in the bearings of the clips and the latter of which are disposed in the bearings of the sleds, whereby to permit the sleds to laterally adjust themselves with respect to the cultivator frame in use, said sleds being each provided with cutters, and with cultivator disks, certain of which act to guide the sleds in the furrows.

5. In a cultivator of the character described, a main wheeled frame, a horizontally disposed cultivator frame in the main frame, the said cultivator frame including transversely extending forward and rear bars, the ends of which project beyond the opposite sides of the main frame, clips adjustably connected to the said ends of the transverse cultivator frame bars and provided with vertical bearings, sleds disposed beneath the said end of the cultivator frame bars and provided at their forward and rear ends with U-shaped hangers each of which is provided at its upper end with a vertically disposed bearing, carrying rods having downturned forward and rear ends respectively disposed in the bearings of the clips and the said hanger bars, runners secured to the lower extremities of the hanger bars and arranged parallel with one another, cutters secured to the said runners, and cultivator disks carried by the lower extremities of the hanger bars at the forward ends, and upon opposite sides, of the sleds, the said disks being disposed to guide the sleds in the rows.

EDWIN MELTON.

Witnesses:
ARTHUR C. LEWIS,
WILLIAM J. CURREN.